United States Patent [19]

Bertram et al.

[11] Patent Number: 4,755,568

[45] Date of Patent: Jul. 5, 1988

[54] SUBSTITUTED PHENOL-FORMALDEHYDE NOVOLAC RESINS CONTAINING REDUCED QUANTITIES OF 2-FUNCTIONAL COMPONENTS AND EPOXY NOVOLAC RESINS PREPARED THEREFROM

[75] Inventors: James L. Bertram, Lake Jackson; Louis L. Walker, Clute; Avis L. McCruary, Lake Jackson; Fermin M. Cortez, Sweeny, all of Tex.

[73] Assignee: The Dow Chemical Company, Midland, Mich.

[21] Appl. No.: 16,046

[22] Filed: Feb. 18, 1987

Related U.S. Application Data

[63] Continuation-in-part of Ser. No. 690,702, Jan. 11, 1985, abandoned.

[51] Int. Cl.$^4$ .................. C08L 61/08; C08L 63/02; C08K 3/04
[52] U.S. Cl. .................. 525/481; 525/507; 523/466; 523/468
[58] Field of Search .................. 523/222, 466, 468; 525/481, 507; 528/129, 165

[56] References Cited

U.S. PATENT DOCUMENTS

| | | | |
|---|---|---|---|
| 3,928,288 | 12/1975 | Walker | 260/59 EP |
| 4,611,036 | 9/1986 | Sekyuchi et al. | 525/481 |
| 4,649,188 | 3/1987 | Bertram et al. | 528/165 |

OTHER PUBLICATIONS

Lee et al; Handbook of Epoxy Resins; McGraw-Hill Book Co.; 1967, pp. 2–10, 11–14, 11–15.
Quatrex; Dow Chemical Co.; Form No. 296-598-85.

*Primary Examiner*—John C. Bleutge
*Assistant Examiner*—David W. Woodward

[57] ABSTRACT

The 2-functional component of substituted phenol-aldehyde novolac resins is reduced. Epoxy novolac resins prepared from the novolac resin containing reduced quantities of 2-functional product exhibit increased Tg values when cured.

40 Claims, No Drawings

SUBSTITUTED PHENOL-FORMALDEHYDE NOVOLAC RESINS CONTAINING REDUCED QUANTITIES OF 2-FUNCTIONAL COMPONENTS AND EPOXY NOVOLAC RESINS PREPARED THEREFROM

CROSS REFERENCE TO RELATED APPLICATION

This is a continuation-in-part of our copending application Ser. No. 690,702 filed Jan. 11, 1985, now abandoned.

BACKGROUND OF THE INVENTION

The present invention pertains to epoxy novolac resins and their novolac resin precursors.

High functional (average functionality of about 5–8) epoxy novolac resins have high Tg values when cured with sulfanilamide. However, they are very difficult to prepare due to the high viscosity of the novolac resin precursors. The present invention provides a method for preparing epoxy novolac resins having high Tg values when cured with typical epoxy curing agents such as, for example, methylenedianiline, diaminodiphenylsulfone, sulfanilamide and the like while having a relatively low melt viscosity.

SUMMARY OF THE INVENTION

One aspect of the present invention pertains to the product which results from removing at least about 25, suitably at least about 35, more suitably at least about 50, most suitably at least about 70, weight percent of the 2-functional component from a novolac resin which results from reacting (1) a material having at least one aromaticl hydroxyl group per molecule selected from the group consisting of (a) a substituted phenol wherien the substituent groups are hydroxyl, hydrocarbyl or hydrocarbyloxy, groups having from 1 to about 9, suitably from about 1 to about 4, carbon atoms, or a halogen; and (b) a mixture of said substituted phenol and phenol wherein more than about 50, suitably more than about 60, more suitably more than about 70, most suitably about 85 molar percent of the mixture is a substituted phenol; with (2) an aldehyde.

Another aspect of the present invention pertains to a novolac resin which results from reacting (1) a material having at least one aromatic hydroxyl group per molecule selected from the group consisting of (a) a substituted phenol wherein the substituent groups are hydroxyl, hydrocarbyl or hydrocarbyloxy groups having from 1 to about 9, suitably from about 1 to about 4, carbon atoms, or a halogen ;and (b) a mixture of said substituted phenol and phenol wherein more than about 50, suitably more than about 60, more suitably more than about 70, most suitably more than about 85 molar percent of the mixture is a substituted phenol; with (2) an aldehyde; wherein said novolac resin has a weight ratio of 2-functional component to 3-functional component of not greater than about 0.7:1, suitably not greater than about 0.5:1, more suitably not greater than about 0.4:1, most suitably not greater than about 0.2:1.

Another aspect of the present invention pertains to epoxy novolac resins resulting from dehydrohalogenating the reaction product of the aforementioned novolac resins with an epihalohydrin.

Another aspect of the present invention pertains to curable mixtures of the aforementioned epoxy novolac resins and a curing quantity of a suitable curing agent therefor.

Another aspect of the present invention pertains to curable mixtures of an epoxy resin having an average of more than one vicinal epoxy group per molecule and a curing amount of the aforementioned novolac resin having at least a portion of the 2-functional material removed.

Another aspect of the present invention pertains to the product resulting from curing the aforementioned curable mixtures.

DETAILED DESCRIPTION OF THE PRESENT INVENTION

By the expression "2-functional component" as employed herein it is meant that portion of the novolac resin or epoxy novolac resin wherein n has a value of zero.

By the expression "3-functional component" as employed herein, it is meant that portion of the novolac resin or epoxy novolac resin wherein n has a value of 1.

By the expression "average functionality" as employed herein, it means the average number of aromatic rings containing hydroxyl groups or epoxy groups as appropriate per molecule.

The novolac resins of the present invention can be represented by the formula

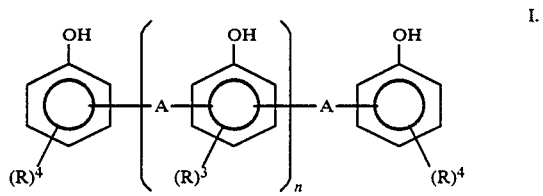

wherein each A is independently a divalent hydrocarbon group or a divalent hydrocarbon group substituted with any inert substituent group such as for example, a halogen such as chlorine, bromine or fluorine, said hydrocarbon having from 1 to about 14, suitably from 1 to about 8, carbon atoms; each R is independently hydrogen, a halogen atom, a hydroxyl group or a hydrocarbon or hydrocarbyloxy group having from about 1 to about 9, suitably from 1 to about 4, carbon atoms and n has an average value of from 1 to about 10, suitably from about 2 to about 8, most suitably from about 3 to about 6; with the proviso that more than 50, suitably more than 60 and more suitably more than 70 percent of the aromatic rings has at least one R group which is other than hydrogen.

Suitable aromatic hydroxyl-containing materials which can be employed herein include, for example, those represented by the formula

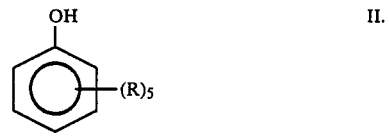

wherein each R is independently hydrogen, a halogen atom, a hydroxyl group or a hydrocarbon group having from 1 to about 9, preferably from 1 to about 4 carbon atoms.

Particularly suitable materials include, for example, methylphenol (cresol), ethylphenol, propylphenol, butylphenol, nonylphenol, bromophenol, chlorophenol, resorcinol, hydroquinone, catechol, mixtures or phenol and any one or more of the above mentioned substituted phenols.

Suitable aldehydes which can be employed herein include any aliphatic, cycloaliphatic or aromatic aldehyde having from 1 to about 14, preferably from 1 to about 8, carbon atoms. Particularly suitable such aldehydes include, for example, formaldehyde, acetaldehyde, propionaldehyde, butyraldehyde, benzaldehyde, mixtures thereof and the like.

Suitable acid catalysts which can be employed herein include, for example, oxalic acid, p-toluene sulfonic acid, benzene sulfonic acid, hydrochloric acid, sulfuric acid, mixtures thereof and the like.

The reaction between the aldehyde and the monohydric aromatic material can be carried out at any suitable temperature such as, for example, from about 90° C. to about 150° C., preferably from about 100° C. to about 120° C. The reaction is continued until the reaction is substantially complete, usually from about 0.5 to about 6 hours (1800-21600-s), preferably from about 1 to about 2 hours (3600-7200 s).

The reaction is conducted under conditions and a molar ratio of aldehyde to phenolic hydroxylcontaining material such that the resulting novolac resin prior to removal of any two functional material is represented by the aforementioned formula 1 wherein the average value of n is from about 0.5 to about 10, suitably from about 1 to about 8, more suitably from about 1.5 to about 4.

The water extraction step which can be employed to prepare the novolac resins of the present invention can be multistage batch extractions or it can be by continuous co-current or counter-current extraction.

The water extraction is usually conducted at a temperature of from about 60° C. to about 180° C., preferably from about 90° C. to about 150° C. and the number of extractions or the contact time is that which is sufficient to produce the desired result, i.e. produce a product containing at least about 25, suitably at least about 35, more suitably at least about 50, most suitably at lest about 75, percent by weight less of the two functional material than was originally present in the novolac resin prior to water extraction, distilling or other means for removal of substantially all or a portion of the 2-functional material.

If desired, the efficiency of the water extraction can be enhanced by employing minor amounts of one or more organic solvents with the water. Suitable such organic solvents include, for example, ketones, alcohols and glycol ethers. Particularly suitable organic solvents include, for example, acetone, methyl ethyl ketone, methyl isobutyl ketone, methanol, ethanol, isopropanaol, amyl alcohol, monomethyl ether of dipropylene glycol, mixtures thereof and the like.

Also, if desired, the two functional novolac resin can be removed from the aqueous extract by extraction with a suitable organic solvent such as those mentioned above which are not miscible with water, with methyl isobutyl ketone being particularly suitable.

Other suitable methods for removing portions of the 2- functional component such as vacuum distillation have also been employed.

The epoxy novolac resins of the present invention are prepared in the usual manner employing the novolac resin having less of the 2-functional product than was originally present in the original novolac resin prior removal of the 2-functional material. The novolac resin is reacted with an epihalohydrin and then subjected to dehydrohalogenation with a basic-acting material such as, for example, sodium hydroxide, potassium hydroxide, sodium carbonate, combinations thereof and the like by well known methods, some of which are disclosed in *Handbook of Epoxy Resins* by Lee and Neville, McGraw-Hill, 1967, which Handbook is incorporated herein by reference.

The epoxy novolac resins of the present invention can be represented by the formula

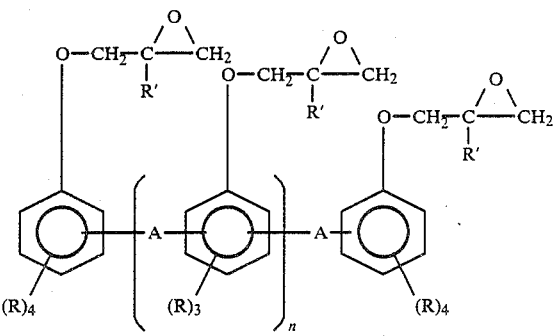

wherein A, R and n are as previously defined and R' is hydrogen or an alkyl group having from 1 to about 4 carbon atoms with the proviso that more than about 50, suitably more than about 60, more suitably more than about 70 percent of the aromatic rings contain at least one R group which is not hydrogen.

Suitable epoxy resins which can be cured with the novolac resins of the present invention include, for example, the glycidyl ethers of polyhydric phenols, bisphenols, novolac resins, aliphatic polyols, nitrogen-containing compounds and the like. These and other suitable epoxy resins are disclosed in the aforementioned *Handbook of Epoxy Resins*, particularly Chapters 2 and 3, which is incorporated herein by reference. Any material having an average of more than one epoxy group per molecule can be cured with the novolac resins of the present invention.

In curing epoxy resins with the novolac resins of the present invention, the usual quantity to be employed is that which provides a phenolic hydroxyl group:epoxy ratio of from about 0.8:1 to about 1.1:1, preferably from about 0.9:1 to about 1:1. In some instances, a suitable curing quantity may be outside these enumerated quantities.

The epoxy novolac resins of the present invention can be cured with any of the well known curing agents for epoxy resins, many of which are enumerated in the aforementioned *Handbook of Epoxy Resins*, which is incorporated herein by reference. Such curing agents include, for example, primary and secondary amines, polycarboxylic acids and anhydrides thereof, biguanides, guaidines, sulfonamides, materials containing a plurality of phenolic hydroxyl groups, urea-aldehyde resins, melamine-aldehyde resins, polyamide resins, combinations thereof and the like. Particularly suitable curing agents include, for example, ethylenediamine, diethylenetriamine. triethylenediamine, tetraethylenepentamine, methylene dianiline, phenol-formaldehyde novolac resins, bisphenol A, sulfanilamide, diaminodiphenylsulfone, dicyandiamide, combinations thereof and the like.

The curable compositions of the present invention can also contain other components such as, but not limited to, solvents, fillers, reinforcing materials, dyes, pigments, flow control agents, fire retardant agents, rubber modifiers, surfactants, accelerators, mold release agents, diluents, any combination thereon and the like.

Suitable fillers include, for example, silica, talc, titanium dioxide, alumina, mica, combinations thereof and the like.

Suitable reinforcing materials include, for example, natural and synthetic fibrous materials in woven, mat, filament, chopped or other suitable form. Particularly suitable fibers include, for example, nylon, graphite, glass, rayon, aromatic polyamide, combinations thereof and the like.

The compositions of the present invention can be employed in the preparation of composites, moldings, castings, coatings, adhesives, laminates, encapsulants and the like. Applications include, particularly structural and electrical applications.

The following examples are illustrative of the present invention but are not to be construed as to limiting the scope thereof in any manner.

TEST METHODS

The following test methods were employed in the Exmaples.

MOLECULAR WEIGHT

The molecular weight was determined using standard gel permeation chromatography (GPC) methods using polystyrene standards for molecular weight calibration.

GLASS TRANSITION TEMPERATURE

The Glass transition temperature, (Tg), was determined using a DuPont 1090 analyzer with a model 912 differential scanning calorimeter (DSC) For Tg up to about 250° C. For Tg's >250° C., a DuPont model 943 thermal mechanical analyzer (TMA) was employed.

SOFTENING POINTS

The softening points were determined employing a Mettier model FP-53 softening point apparatus (MSP).

The following novolac resins were employed in the examples.

NOVOLAC RESIN A was a cresol-formaldehyde novolac resin having a Mettier softening point of 84.2° C., a weight average molecular weight of 570, a polydispersity of 1.29 and contained 15.44 percent by weight of 2-functional component and a weight ratio of 2-functional component to 3-functional component of 0.91:1.

NOVOLAC RESIN B was a nonylphenol-formaldehyde novolac resin having a weight average molecular weight of 580, a number average molecular weight of 518, a polydispersity of 1.12 and contained 36.33 percent by weight of 2-functional component and a weight ratio of 2-functional component to 3-functional component of 1.06:1.

EXAMPLE 1

A. Removal of 2-Functional Component

The 2-functional content of Novolac Resin A was reduced by subjecting the novolac resin to distillation in a wiped film evaporator operated at 1 mm Hg (abs.), 250° C. ($\mp 5°$ C.). The feed rate was 1 cc/min. (0.0167 cc/sec.), and the condenser temperature was 25° C. The resultant novolac resin had a weight average molecular weight of 739, a number average molecular weight of 643, a polydispersity of 1.15 and contained 1.49 percent by weight of 2-functional component. and a weight ratio of 2-functional component to 3-functional component of 0.22:1.

B. Preparation of Epoxy Novolac Resin

The Novolac Resin prepared in 1-A above, 50 grams, was dissolved in 194.3 grams of epichlorohydrin, 104.6 grams of isopropanol and 16.9 grams of water. This mixture was then heated to 70° C. and 75.6 grams of 20% aqueous sodium hydroxide was added during approximately 45 minutes (2700 s). The reaction mixture was digested at this temperature for an additional 15 minutes (900 s). Then the aqueous phase separated and was discarded. Twenty percent aqueous sodium hydroxide, 33.6 grams, was added to the mixture at 70° C. during approximately 20–30 minutes (1200–1800 s). The reaction was digested for an additional 15–20 minutes (900–1200 s) at 70° C., then cooled. The aqueous layer was separated and the organic layer was repeatedly washed with water until free of salt and sodium hydroxide. The product was obtained by removing the excess epichlorohydrin and solvent via vacuum distillation. The epoxy resin product had an epoxy content of 20.6%, and an epoxide equivalent weight of 208.2.

C. Preparation of Epoxy Novolac Resin (For Comparative Purposes)

Novolac Resin A, 50 grams, was dissolved in 194.3 grams of epichlorohydrin, 104.6 grams of isopropanol and 16.9 grams of water. This mixture was then heated to 70° C. and 75.6 grams of 20% aqueous sodium hydroxide was added during approximately 45 minutes (2700 s). The reaction mixture was digested at this temperature for an additional 15 minutes (900 s). Then the aqueous phase separated and was discarded. Twenty percent aqueous sodium hydroxide, 33.6 grams, was added to the mixture at 70° C. during approximately 20–30 minutes (1200–1800 s). The reaction was digested for an additional 15–20 minutes (900–1200 s) at 70° C., then cooled. The aqueous layer was separated and the organic layer was repeatedly washed with water until free of salt and sodium hydroxide. The product was obtained by removing the excess epichlorohydrin and solvent via vacuum distillation. The epoxy resin product has an epoxy content of 21.3%, and an epoxide equivalent weight of 201.8.

D. Curing of Epoxy Novolac Resin

The epoxy resin from 1-B, 10 grams, was heated to about 150° C., and 3.07 grams of diaminodiphenylsulfone was added. The mixture was stirred until homogeneous, then poured into an aluminum pan and cured as follows: 2 hours (7200 s) at 200° C., and an additional 2 hours (7200 s) at 220° C. The resultant product had a Tg of 247.6° C. by TMA.

E. Curing of Epoxy Novolac Resin (For Comparative Purposes)

The epoxy resin from 1-C, 10 grams, was heated to about 150° C., and 3.07 grams of diaminodiphenylsulfone was added. The mixture was stirred until homogeneous, then poured into an aluminum pan and cured as follows: 2 hours (7200 s) at 200° C., and an additional 2 hours (7200 s) at 220° C. The resultant product had a Tg of 215.7° C. by TMA.

EXAMPLE 2

A. Removal of 2-Functional Component

First Distillation: A portion of Novolac Resin B was subjected to distillation with a wiped film evaporated operated at 1 mm Hg abs. and 315° C. (∓5° C.) at a feed rate of 1 cc/min. (0.016 cc/sec.), with the internal condenser temperature at 45° C. The resultant novolac resin was analyzed by gel permeation chromatography and was found to contain 22.78% by weight 2-functional component and a weight ratio of 2-functional component to 3-functional component of 0.55:1.

Second Distillation: The product from the first distillation was subjected to further distillation using a wiped film evaporator operated at 1 mm Hg abs. and 255° C. (∓5° C.) at a feed rate of 2 cc/min. (0.033 cc/sec.), with the internal condenser temperature at 45° C. The resultant novolac resin was analyzed by gel permeation chromatography and was found to have a weight average molecular weight of 797, a number average molecular weight of 741 with a polydispersity of 1.07 and contained 9.17% by weight 2-functional components. The weight ratio of 2-functional component to 3-functional component was 0.19:1.

B. Preparation of Epoxy Novolac Resin

The Novolac Resin prepared in 2-A above, 53.67 grams, was dissolved in 107.45 grams of epichlorohydrin, 57.86 grams of isopropanol and 9.34 grams of water. This mixture was then heated to 70° C. and 41.8 grams of 20% aqueous sodium hydroxide was added during approximately 45 minutes (2700 s). The reaction mixture was digested at this temperature for an additional 15 minutes (900 s). Then the aqueous phase separated and was discarded. Twenty percent aqueous sodium hydroxide, 18.58 grams, was added to the mixture at 70° C. during approximately 20-30 minutes (1200-1800 s). The reaction was digested for an additional 15-20 minutes (900-1200 s) at 70° C., then cooled. The aqueous layer was separated and the organic layer was repeatedly washed with water until free of salt and sodium hydroxide. The product was obtained by removing the excess epichlorohydrin and solvent via vacuum distillation. The epoxy resin product had an epoxy content of 10.04%, and an epoxide equivalent weight of 428.

C. Preparation of Epoxy Novolac Resin (For Comparative Purposes)

A portion of Novolac Resin B, 30.39 grams, was dissolved in 121.63 grams of epichlorohydrin, 65.5 grams of isopropanol and 10.57 grams of water. This mixture was then heated to 70° C. and 23.65 grams of 20% aqueous sodium hydroxide was added during approximately 45 minutes (2700 s). The reaction mixture was digested at this temperature for an additional 15 minutes (900 s). Then the aqueous phase separated and was discarded. Twenty percent aqueous sodium hydroxide, 10.52 grams, was added to the mixture at 70° C. during approximately 20-30 minutes (1200-1800 s). the reaction was digested for an additional 15-20 minutes (900-1200 s) at 70° C., then cooled. The aqueous layer was separated and the organic layer was repeatedly washed with water until free of salt and sodium hydroxide. The product was obtained by removing the excess epichlorohydrin and solvent via vacuum distillation.

The epoxy resin product has an epoxy content of 11.46%, and an epoxide equivalent weight of 375.2.

D. Curing of Epoxy Novolac Resin

The epoxy resin from 2-B, 4.28 grams, was heated in an aluminum pan to about 150° C., and 1.14 grams of bisphenol A and 5 meq. of tetrabutyl phosphonium acetate.acetic acid complex was added. The mixture was stirred until homogeneous and cured as follows: 2 hours (7200 s) at 150° C., and an additional 2 hours (7200 s) at 200° C. The resultant product had a Tg of 78.7° C. by TMA.

E. Curing of Epoxy Novolac Resin (For Comparative Purposes)

The epoxy resin from 2-C, 3.75 grams, was heated in an aluminum pan to about 150° C., and 1.14 grams of bisphenol A and 5 meq. of tetrabutyl phosphonium acetate.acetic acid complex was added. The mixture was stirred until homogeneous and cured as follows: 2 hours (7200 s) at 150° C., and an additional 2 hours (7200 s) at 200° C. The resultant product had a Tg of 71.1° C. by TMA.

We claim:

1. A curable mixture comprising an epoxy resin having an average of more than one vicinal epoxy group per molecule and a curing amount of a novolac resin which results from removing at least about 25 weight percent of the 2-functional component from a novolac resin which results from reacting (1) a material having at least one aromatic hydroxyl group per molecule selected from the group consisting of (a) a substituted phenol wherein the substituent groups are hydroxyl, hydrocarbyl or hydrocarbyloxy groups having from 1 to about 9 carbon atoms, or a halogen; and (b) a mixture of said substituted phenol and phenol wherein more than about 50 molar percent of the mixture is a substituted phenol; with (2) an aldehyde.

2. A curable mixture of claim 1 wherein the novolac resin is that which results from removing at least about 35 weight percent of the 2-functional component from a novolac resin represented by the formula

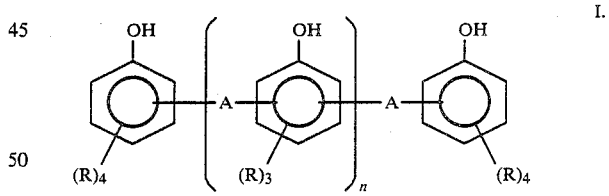

wherein each A is independently a divalent hydrocarbon group or a divalent hydrocarbon group substituted with any inert substituent group selected from chlorine, bromine or fluorine, said hydrocarbon having from 1 to about 14 carbon atoms; each R is independently hydrogen, a halogen atom, a hydroxyl group or a hydrocarbon group having from about 1 to about 9 carbon atoms and n has an average value of from about 0.5 to about 10; with the proviso that more than about 60 percent of the aromatic rings have at least one R group which is other than hydrogen.

3. A curable mixture of of claim 2 wherein the novolac resin is that which results from removing at least about 50 weight percent of the 2-functional component from a novolac resin wherein each A is independently a divalent hydrocarbon group or a divalent hydrocarbon group substituted with any inert substituent group selected from chlorine, bromine or fluorine, said hydrocarbon having from 1 to about 8 carbon atoms; and n has an average value of from about 1 to about 8; and wherein more than 70 about percent of the aromatic rings have at least one R group which is other than hydrogen.

4. A curable mixture of claim 3 wherein the novolac resin is that which results from removing at least about 70 weight percent of the 2-functional component from a novolac resin wherein n has an average value of from about 1.5 to about 4; and wherein more than about 85 percent of the aromatic rings have at least one R group which is other than hydrogen.

5. A curable mixture of claim 1, 2, 3 or 4 wherein said substituted phenol is an alkyl phenol and said aldehyde is formaldehyde.

6. A curable mixture of claim 5 wherein said alkyl phenol is nonylphenol or cresol.

7. A curable mixture of claim 6 wherein said alkyl phenol is cresol.

8. A curable mixture of claim 1, 2, 3 or 4 wherein said substituted phenol is a halogen substituted phenol and said aldehyde is formaldehyde.

9. A curable mixture of claim 8 wherein said halogen substituted phenol is chlorophenol or bromophenol.

10. A curable mixture comprising an epoxy resin having an average of more than one vicinal epoxy group per molecule and a curing amount of a novolac resin which results from reacting an aldehyde with a phenolic hydroxyl-containing material which is (a) a phenol substituted with at least one but not more than about three groups selected from hydrocarbyl, halogen or hydroxyl groups, or any combination thereof or (b) a mixture of a phenol substituted with at least one but not more than about three groups selected from hydrocarbyl, halogen or hydroxyl groups, or any combination thereof with phenol with the proviso that at least 50 mole percent of the mixture is a substituted phenol; wherein said novolac resin has a ratio of 2-functional component to 3-functional component of not greater than 0.7:1.

11. A curable mixture of claim 10 wherein said novolac resin has a ratio of 2-functional component to 3-functional component of not greater than about 0.5:1; and when said phenolic hydroxyl-containing material is a mixture of phenol and a substituted phenol, said mixture contains at least 70 mole percent substituted phenol.

12. A curable mixture of claim 11 wherein said novolac resin has a ratio of 2-functional component to 3-functional component of not greater than abou 0.4:1; and when said phenolic hydroxyl-containing material is a mixture of phenol and a substituted phenol, said mixture contains at least 85 mole percent substituted phenol.

13. A curable mixture of claim 12 wherein said novolac resin has a ratio of 2-functional component to 3-functional component of not greater than about 0.2:1.

14. A curable mixture of claim 10, 11, 12 or 13 wherein said substituted phenol is an alkyl phenol and said aldehyde is formaldehyde.

15. A curable mixture of claim 13 wherein said alkyl phenol is nonylphenol or cresol.

16. A curable mixture of claim 14 wherein said alkyl phenol is cresol.

17. A curable mixture of claim 10, 11, 12 or 13 wherein said substituted aldehyde is formaldehyde.

18. A curable mixture of claim 17 wherein said halogen substituted phenol is chlorophenol or bromophenol.

19. The product resulting from curing the curable mixture of claim 1, 2, 3, 4, 10, 11, 12 or 13.

20. The product resulting from curing the curable mixture of claim 5.

21. The product resulting from curing the curable mixture of claim 6.

22. The product resulting from curing the curable mixture of claim 7.

23. The product resulting from curing the curable mixture of claim 8.

24. The product resulting from curing the curable mixture of claim 14.

25. The product resulting from curing the curable mixture of claim 15.

26. The product resulting from curing the curable mixture of claim 16.

27. The product resulting from curing the curable mixture of claim 17.

28. The product resulting from curing the curable mixture of claim 18.

29. The cured product of claim 19 which contains a reinforcing component.

30. The cured product of claim 20 which contains a reinforcing component.

31. The cured product of claim 21 which contains a reinforcing component.

32. The cured product of claim 22 which contains a reinforcing component.

33. The cured product of claim 23 which contains a reinforcing component.

34. The cured product of claim 24 which contains a reinforcing component.

35. The cured product of claim 25 which contains a reinforcing component.

36. The cured product of claim 26 which contains a reinforcing component.

37. The cured product of claim 27 which contains a reinforcing component.

38. The cured product of claim 28 which contains a reinforcing component.

39. The product resulting from curing the curable mixture of claim 9.

40. The cured product of claim 39 which contains a reinforcing agent.

* * * * *

UNITED STATES PATENT AND TRADEMARK OFFICE
CERTIFICATE OF CORRECTION

PATENT NO. : 4,755,568

DATED : July 5, 1988

INVENTOR(S) : James L. Bertram, Louis L. Walker, Avis L. McCrary and Fermin M. Cortez It is certified that error appears in the above-identified patent and that said Letters Patent is hereby corrected as shown below: Title page:

1st page, "Inventors' Names"; change "McCruary" to --McCrary--.

1st page, "Other Publications", 2nd line; insert --2-11-- after "2-10".

Col. 1, line 35; change "aromaticl" to --aromatic--.

Col. 1, line 36; change "wherien" to --wherein--.

Col. 3, line 4; insert --mixtures thereof and the like. Also suitable are-- after "catechol,".

Col. 3, line 4; change "or" to --of--.

Col. 3, line 44; change "lest" to --least--.

Col. 4, line 61; change "guaidines," to --guanidines,--.

Col. 5, line 8; insert a space between "diluents," and "any".

Col. 5, line 29; change "Exmaples" to --Examples--.

Col. 5, line 45; change "Mettier" to --Mettler--.

Col. 5, line 49; change "Mettier" to --Mettler--.

Col. 5, line 50; insert --a number average molecular weight of 443,-- after "570,".

Col. 6, line 48; change "has" to --had--.

UNITED STATES PATENT AND TRADEMARK OFFICE
CERTIFICATE OF CORRECTION

PATENT NO. : 4,755,568

DATED : July 5, 1988

INVENTOR(S) : James L. Bertram, Louis L. Walker, Avis L. McCrary and Fermin M. Cortez It is certified that error appears in the above-identified patent and that said Letters Patent is hereby corrected as shown below:

Col. 7, line 5; change "evaporated" to --evaporator--.

Col. 8, line 1; change "has" to --had--.

Col. 8, line 64, Claim 3; delete 2nd occurrence of "of".

Col. 9, line 55, Claim 12; change "abou" to --about--.

Col. 10, line 12, Claim 17; insert --phenol is a halogen substituted phenol and said-- after "substituted".

Signed and Sealed this

Twenty-first Day of February, 1989

Attest:

DONALD J. QUIGG

Attesting Officer

Commissioner of Patents and Trademarks